United States Patent
Herman et al.

(10) Patent No.: US 9,223,787 B2
(45) Date of Patent: Dec. 29, 2015

(54) SYSTEMS AND METHODS FOR SIDEBAND COMMUNICATION BETWEEN DEVICE AND HOST TO MINIMIZE FILE CORRUPTION

(75) Inventors: Kenneth Herman, San Jose, CA (US); Daniel Fletcher, Sunnyvale, CA (US); Matthew Rogers, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 1018 days.

(21) Appl. No.: 12/239,354

(22) Filed: Sep. 26, 2008

(65) Prior Publication Data
US 2010/0082711 A1    Apr. 1, 2010

(51) Int. Cl.
*G06F 7/00* (2006.01)
*G06F 17/30* (2006.01)

(52) U.S. Cl.
CPC .............. *G06F 17/30067* (2013.01)

(58) Field of Classification Search
CPC . G06F 13/423; G06F 13/4234; G06F 13/426; G06F 15/17; G06F 21/42; G06F 3/0655; G06F 17/30067; G06F 9/544
USPC ............. 707/687, 610, 612, 613, 617, 621, 707/999.101
See application file for complete search history.

(56) References Cited

U.S. PATENT DOCUMENTS

| | | | | |
|---|---|---|---|---|
| 6,711,632 B1* | 3/2004 | Chow | G06F 12/0804 | 709/237 |
| 6,721,787 B1* | 4/2004 | Hiscock | H04W 4/00 | 370/277 |
| 7,369,517 B2* | 5/2008 | Dillinger | G06F 11/1433 | 370/310 |
| 7,870,412 B2* | 1/2011 | Maes | G06F 9/52 | 707/610 |
| 7,882,291 B2* | 2/2011 | Oh | G06F 9/544 | 710/118 |
| 7,945,750 B2* | 5/2011 | Arakawa | G06F 11/2064 | 711/151 |
| 8,712,562 B1* | 4/2014 | Weitz | H04H 60/04 | 700/94 |
| 9,060,046 B2* | 6/2015 | Gindentuller | H04L 65/604 | 1/1 |
| 2002/0184259 A1* | 12/2002 | Akishita et al. | | 707/501.1 |
| 2003/0206553 A1* | 11/2003 | Surcouf et al. | | 370/419 |
| 2004/0044811 A1* | 3/2004 | Vrancic | G06F 5/16 | 710/53 |
| 2005/0207423 A1* | 9/2005 | Herbst | | 370/395.7 |
| 2006/0242206 A1* | 10/2006 | Brezak | G06F 17/30176 | 1/1 |
| 2007/0288614 A1* | 12/2007 | May | H04L 67/1095 | 709/223 |
| 2008/0016150 A1* | 1/2008 | Chen | G06F 8/61 | 709/203 |
| 2008/0077916 A1* | 3/2008 | Supalov | H04L 12/40013 | 718/1 |
| 2008/0214158 A1* | 9/2008 | Osborne | H04M 1/72525 | 455/414.1 |
| 2009/0064041 A1* | 3/2009 | Bull | G11B 27/34 | 715/810 |
| 2009/0164750 A1* | 6/2009 | Atri | G06F 11/1474 | 711/209 |
| 2009/0210595 A1* | 8/2009 | Chaussade | H03M 7/46 | 710/110 |
| 2010/0002066 A1* | 1/2010 | Nelson | G11B 27/034 | 348/14.1 |
| 2010/0054347 A1* | 3/2010 | Schuller | G08C 19/34 | 375/259 |

* cited by examiner

*Primary Examiner* — Mohammed R Uddin
(74) *Attorney, Agent, or Firm* — Van Court & Aldridge LLP (57) ABSTRACT

Communications systems and methods for minimizing file corruption when communicating between a device and a host are provided. To initiate a file transfer section, a host can transfer data to a device on a primary communications channel. The device can then temporarily store the received data in a memory circuit until a command is received indicating that the file has been completely transferred. In order to avoid interfering with the data transfer, the host can provide such a command to the device on a sideband communications channel. Upon receiving the command, the device can integrate the received data into its file system by transferring the data from the memory circuit to a more permanent storage component. If the communications interface is disconnected before such a command is received, the temporarily stored data can be considered incomplete and can be deleted.

11 Claims, 4 Drawing Sheets

SYSTEMS AND METHODS FOR SIDEBAND COMMUNICATION BETWEEN DEVICE AND HOST TO MINIMIZE FILE CORRUPTION

FIELD OF THE INVENTION

This relates to systems and methods for communicating between a device and a host and, more particularly, to systems and methods for minimizing file corruption when communicating between a device and a host.

BACKGROUND OF THE DISCLOSURE

File corruption can occur when a communications interface is abruptly disconnected. For example, file corruption can occur when a disrupted file transfer results in incomplete data on a device.

As used herein, the term file system data refers to any data that represents information about a file system. For example, file system data can include one or more pointers to other data in a file system (e.g., a file allocation table). In some systems, file system data can include directory information such as data representing a directory's contents (e.g., a directory table).

When file system data is corrupted, all or a portion of the files in the file system may become inaccessible. For example, corrupted file system data may include pointers that don't accurately indicate the location of file data. Accordingly, file corruption can be even more problematic when file system data, as opposed to actual file data, is corrupted.

Some traditional communications systems attempt to minimize file corruption by repeatedly transmitting file system data during communications. However, such systems still experience significant file corruption if the communications interface is disrupted when transmitting file system data. In such a scenario, the file system data won't match the actual file data, and all or a portion of the files in the file system may be inaccessible.

SUMMARY OF THE DISCLOSURE

Communications systems and methods for minimizing file corruption when communicating between a device and a host are provided. In accordance with the invention, a host can communicate with a device on a primary communications channel and a sideband communications channel. Both channels may pass through the same communications interface, but each channel may correspond to different protocols and/or subsystems in the host and the device. For example, a host can communicate with a device in accordance with a Universal Serial Bus (USB) protocol, but the communications may include both a primary communications channel for transferring data between file systems and a sideband communications channel for transferring commands between control circuitry. Accordingly, data can be transferred on a primary communications channel in accordance with a standard data transfer protocol, and commands can be transferred on a sideband communications channel without interfering with the data or requiring any modification of the data transfer protocol.

To initiate a file transfer, a host can transfer data (e.g., file data and/or file system data) to a device on a primary communications channel. The device can then temporarily store the received data in a memory circuit until a command is received indicating that the file has been completely transferred. In order to avoid interfering with the data transfer, the host can provide such a command to the device on a sideband communications channel. Upon receiving the command, the device can integrate the received data into its file system by transferring the data from the memory circuit to a more permanent storage component. If the communications interface is disconnected before such a command is received, the temporarily stored data can be considered incomplete and can be deleted. Accordingly, file corruption can be minimized because only complete data may be integrated into the device's file system.

In some embodiments, the invention focuses on preserving the integrity of file system data because the most problematic file corruption occurs when file system data is corrupted. For example, incomplete file system data can render a large portion of a file system inaccessible. Given the importance of file system data and practical limits on memory size, a device may only temporarily store file system data in a memory circuit. For example, a device can temporarily store file system data in a memory circuit, while storing file data in the device's more permanent storage component. If the device eventually receives a command indicating that a section of the file transfer is finished, the device can integrate the file system data into its file system by transferring the file system data from the memory circuit to the storage component. If the communications interface is disconnected before such a command is received, the data from the memory circuit can be deleted. Accordingly, the integrity of the file system data may be maintained.

In accordance with some embodiments, a method for minimizing file corruption during a file transfer from a host to a device is provided. The method can include storing received file system data in a memory circuit and storing received file data in a storage component. The method can further include receiving an end command indicating that a file transfer section is finished. The method can also include transferring the received file system data from the memory circuit to the storage component based at least on the receiving the end command.

In accordance with some embodiments, a method for minimizing file corruption during a file transfer from a host to a device is provided. The method can include transmitting file system data on a primary communications channel and transmitting file data on the primary communications channel. The method can also include transmitting, on a sideband communications channel, an end command indicating that a file transfer section is finished.

In accordance with some embodiments, a file transfer system for minimizing file corruption during a file transfer is provided. The system can include a host operable to transmit file system data and file data on a primary communications channel and commands on a sideband communications channel. The system can also include a device coupled to the host. The device can include a storage component operable to store file data received from the host on the primary communications channel and a memory circuit coupled to the storage component. The memory circuit can be operable to temporarily store file system data received from the host on the primary communications channel until the device receives, on the sideband communications channel, a command indicating that a file transfer section is finished. The device can be operable to transfer file system data from the memory circuit to the storage component when the device receives such a command.

BRIEF DESCRIPTION OF THE DRAWINGS

The above and other features of the invention, its nature and various advantages will be more apparent upon consideration of the following detailed description, taken in conjunction with the accompanying drawings, in which like reference characters refer to like parts throughout, and in which.

DETAILED DESCRIPTION OF THE DISCLOSURE

Figure 1:
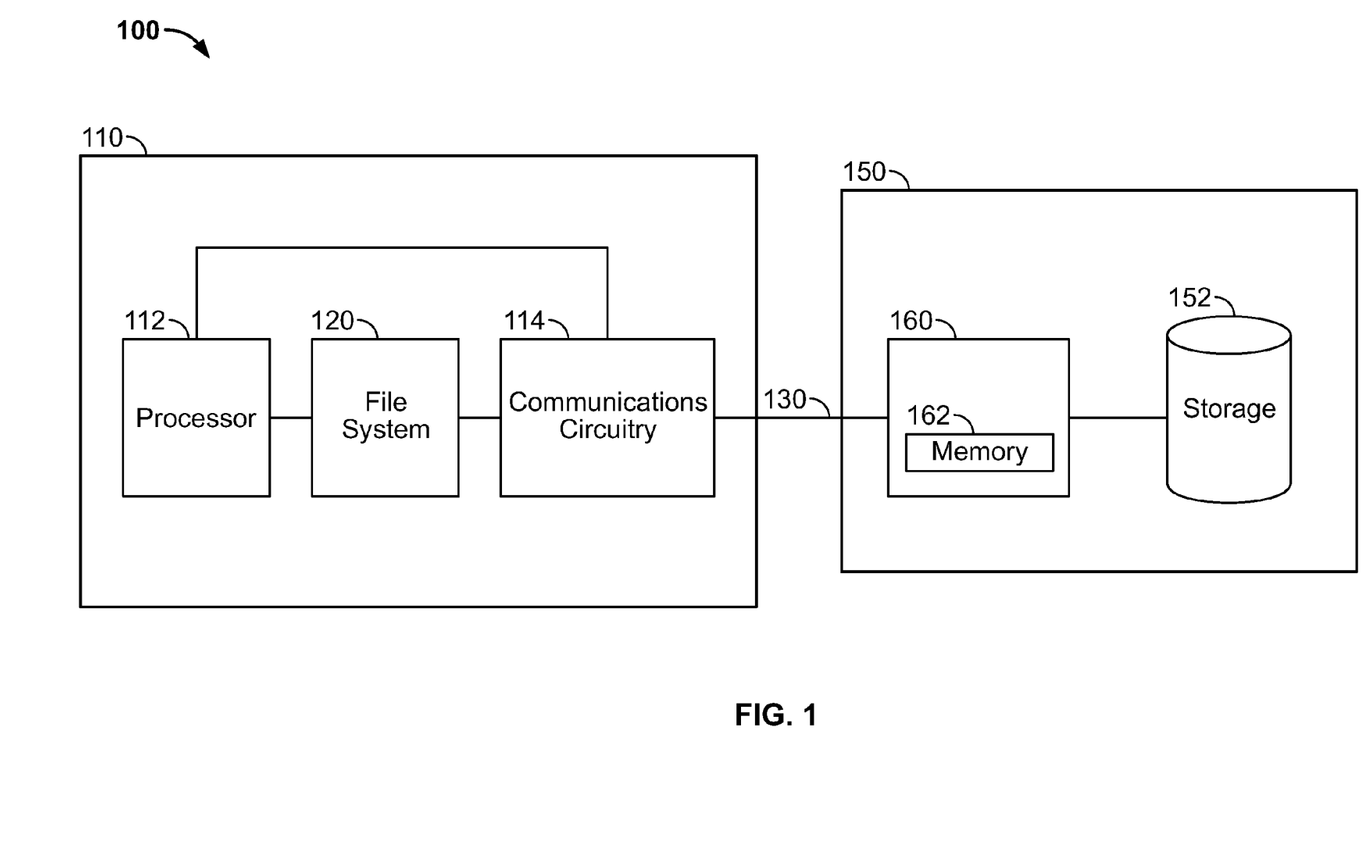
FIG. 1 is a simplified schematic of a communications system in accordance with some embodiments of the invention.

FIG. 1 includes communications system 100 in accordance with some embodiments of the invention. System 100 can include host 110, interface 130, and device 150. Host 110 and device 150 can communicate through interface 130. For example, interface 130 can be a cable coupling host 110 with device 150 so that host 110 can send files to device 150.

Host 110 can be any device with a file system and circuitry for communicating with other devices. For example, host 110 can be a desktop computer or a laptop computer. Host 110 can include processor 112, communications circuitry 114, and file system 120. Processor 112 can be coupled with both communications circuitry 114 and file system 120. Communications circuitry 114 can also be coupled with file system 120.

Processor 112 can include any suitable processor for performing software instructions. In embodiments where host 110 is a computer, processor 112 can include a central processing unit. In other embodiments, processor 112 can include any suitable processor (e.g., a microprocessor). Processor 112 can run one or more software programs stored in host 110. For example, processor 112 can run operating system software that controls the general operation of host 110. Processor 112 can run application software stored in host 110. For example, processor 112 can run software that allows a user to select one or more files to send to device 150.

File system 120 can be any suitable file system for storing data in host 110. For example, file system 120 can be an File Allocation Table (FAT) file system or a New Technology File System (NTFS). File system 120 can include a storage component for storing data (e.g., a hard disk drive or a solid-state drive). File system 120 can provide data to and receive data from processor 112. For example, file system 120 can store data from processor 112 in a storage component. File system 120 can include circuitry (e.g., driver circuitry) for controlling the transfer of data to device 150. For example, file system 120 can include driver circuitry for generating file system data related to the transfer of data to device 150.

Communications circuitry 114 can include any circuitry suitable for communicating with device 150. For example, communications circuitry 114 can include circuitry for communicating in accordance with a Universal Serial Bus (USB) protocol. Communications circuitry 114 can receive data from file system 120 (e.g., file data or file system data) for transmission to device 150. Communications circuitry 114 can also receive commands from processor 112 for transmission to device 150. In some embodiments, communications circuitry 114 can convert data from file system 120 and commands from processor 112 to one or more signals complying with a communications protocol (e.g., a USB protocol), and can then transmit the signals to device 150. For example, communications circuitry 114 can convert data from file system 120 and commands from processor 112 to a pair of differential signals in compliance with the USB protocol. Communications circuitry 114 can transmit data from file system 120 with commands from processor 112 so that the data is on a primary communications channel (e.g., a file system channel) and the commands are on a sideband communications channel.

In some embodiments, communications circuitry 114 can only communicate either data from file system 120 or commands from processor 112 at any particular time. However, communications circuitry 114 may be able to rapidly switch between communicating data from file system 120 and commands from processor 112. Accordingly, communications circuitry 114 can be considered to be communicating both data from file system 120 and commands from processor 112 at substantially the same time. In other embodiments, communications circuitry 114 can integrate data from file system 120 with commands from processor 112 so that both can be communicated at literally the same time. For example, communications circuitry 114 can encode data from file system 120 on a primary carrier frequency and commands from processor 112 on a sideband carrier frequency.

Interface 130 can be any suitable interface for facilitating communications between host 110 and device 150. Interface 130 can be a physical interface (e.g., a cable or a docking station). In some embodiments, interface 130 can include a single conductor (e.g., wire) or single set of conductors that supports communications over all channels. For example, communications interface 130 can include a pair of conductors for transmitting a differential data signal that includes both a primary channel and a sideband channel. In some embodiments, interface 130 can include a different conductor or different sets of conductors for each communications channel. For example, communications interface 130 can include a first pair of conductors for transmitting a differential data signal that includes a primary channel and a second pair of conductors for transmitting a differential data signal that includes a sideband communications channel. In some embodiments, interface 130 can be a wireless interface, and any apparatus necessary for wireless communications (e.g., one or more antennas) can be provided in both host 110 and device 150.

Device 150 can be any device with a storage component and circuitry for communicating with hosts. In addition to communicating with hosts, device 150 may be able to perform one or more additional functions. For example, device 150 can be a portable media device that can store and play media.

Device 150 can include storage component 152 and communications circuitry 160. Storage component 152 can be any component suitable for storing data. For example, storage component 152 can be a hard disk drive or a solid-state drive (e.g., a flash drive).

Communications circuitry 160 can include any circuitry suitable for communicating with host 110. For example, communications circuitry 160 can include circuitry for communicating in accordance with a USB protocol. Communications circuitry 160 can receive one or more signals from host 110 and convert the signals into various communications channels. For example, communications circuitry can convert received signals into a primary communications channel with data from file system 120 (e.g., file data or file system data) and a sideband communications channel with commands from processor 112. Communications circuitry 160 can route one or more portions of each communications channel to other circuitry within device 150. For example, communications circuitry 160 can route received file data to storage component 152.

Communications circuitry 160 can include memory 162 for temporarily storing received data. Memory 162 can be any memory circuit that is suitable for temporarily storing data. For example, memory 162 can be a buffer that includes Random Access Memory (RAM). Communications circuitry 160 can store received data in memory 162. In some embodiments, memory 162 can store only received file system data, and any received file data can be routed directly to storage component 152. In other embodiments, memory 162 can store all received data, including both file system data and file data.

Memory 162 can also store one or more storage block addresses associated with data stored in memory 162. For example, a communications channel can provide one or more storage block addresses, each address associated with a unit of file system data (e.g., a first address associated with a file allocation table and a second address associated with directory information), and memory 162 can store these addresses along with the associated file system data.

While FIG. 1 shows memory 162 within communications circuitry 160, it is understood that memory 162 can be located anywhere within device 150 without deviating from the spirit and scope of the invention.

Communications circuitry 160 can operate based on commands provided through a sideband communications channel from host 110. For example, processor 112 can provide a command that is encoded into a sideband communications channel, and communications circuitry 160 can perform a particular function based on the command. In some embodiments, communications circuitry 160 can transfer data stored in memory 162 to storage component 152 based on a command received on a sideband communications channel. When storage block addresses are also stored in memory 162, communications circuitry 160 can transfer the associated data to locations in storage component 152 based on the storage block addresses.

In some embodiments, communications circuitry 160 can delete the contents of memory 162. For example, communications circuitry 160 can delete the contents of memory 162 based on a command received on a sideband communications channel indicating that a file transfer section is beginning. Deleting the contents of memory 162 in this manner can ensure that any data previously stored in memory 162 is not accidentally combined with data received during the file transfer section.

Figure 2:
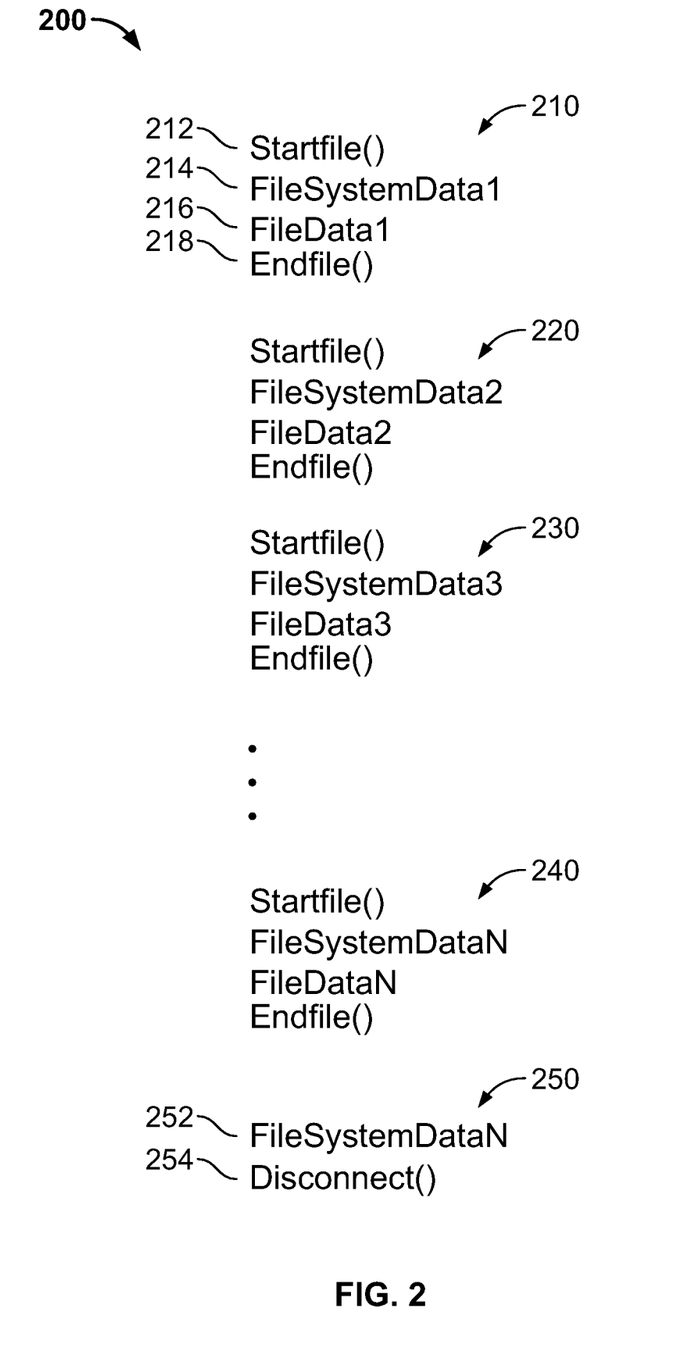
FIG. 2 is a simplified communications sequence in accordance with some embodiments of the invention.

FIG. 2 includes a communications sequence 200 in accordance with some embodiments of the invention. Communications sequence 200 can include a series of commands and data for host 110 to communicate to device 150 on one or more communications channels. Communications sequence 200 can, for example, include commands and data for host 110 to send files 1 through N and the associated file system data to device 150. Communications sequence 200 can include a section of commands and data for each file being transferred and any other communications events. For example, communications sequence 200 can include file transfer sections 210, 220, 230, and 240, as well as eject section 250. Each file transfer section can include data and commands for transferring a single file. Eject section 250 can include data and commands for disconnecting a host from a device.

Each file transfer section can include the data of the file being transferred (i.e., file data). For example, file transfer section 210 can include FileData1 216 that represents all of the data in that particular file.

Each file transfer section can also include data about the file system of the receiving device (i.e., file system data) that incorporates the file being transferred. As previously set forth, file system data can include data representing information about a file system. For example, file system data can include a file allocation table (e.g., FAT0 or FAT1). In some embodiments, file system data can include directory information about the directory to which the file is being transferred. Such directory information can include, for example, a listing of the files in the directory, a listing of the size of each file in the directory, a listing of the date or time that each file in the directory was last modified, the format in which the user prefers to view the directory (e.g., a display preference), any other suitable information about a directory or the files stored therein, and/or any combination of the above. As previously explained, the integrity of file system data can be important for minimizing file corruption because the file system data represents the structure of the file system. Accordingly, incomplete file system data can render the file data for one or more files inaccessible.

Continuing the example of communications sequence 200, file transfer section 210 can include FileSystemData1 214 that can represent file system data incorporating the new file. For example, FileSystemData1 214 can include a new file allocation table (FAT), updated directory information (e.g., an updated listing of the contents of a directory), or any other suitable file system data needed to incorporate the new file (e.g., FileData1 216) into a device's file system.

While the file transfer sections shown in FIG. 2 each include data for transferring only a single file, it is understood that multiple files can be transferred in one file transfer section without deviating from the spirit and scope of the invention. For example, a file transfer section can include file system data and multiple units of file data (e.g., FileData1 216 along with other units of file data). In this manner, a file transfer section can include data for transferring multiple files. In some embodiments, data for transferring all of the files in a communications sequence can be provided in a single file transfer section. However in some embodiments, it may be advantageous to transfer only a single file in each file transfer section because shorter file transfer sections may result in less data loss if the communications interface is abruptly disconnected. For example, disconnecting a communications interface during a file transfer section can result in losing all data transferred during that section, and therefore shorter file transfer sections may be desirable.

While not shown in FIG. 2, it is understood that a communications sequence can also include data representing the location where file data and file system data are to be stored when received by a device. In some embodiments, a communications sequence can include an address for each unit of data (e.g., a storage block address) that specifies where that unit of data is to be stored in the receiving device's storage component. For example, communication sequence 200 can include a storage block address specifying that FileData1 216 is to be stored in a particular block in the receiving device's storage component. Moreover, communications sequence 200 can include a storage block address specifying where FileSystemData1 214 is to be stored. For example, if FileSystemData1 214 includes a file allocation table, the corresponding storage block address can indicate where FAT0 or FAT1 are to be stored in the receiving device's storage component. In some embodiments, multiple units of file system data can be provided in a file transfer section, and a storage block address can be provided for each unit. For example, a file transfer section of a communications sequence can include both an updated file allocation table and updated directory information, and a storage block address can be provided for each.

While FIG. 2 shows file system data preceding file data, it is understood that file system data and file data can be provided in any order without deviating from the spirit and scope of the invention. For example, FileSystemData1 214 can be provided after FileData1 216 in some embodiments. It is further understood that portions of file system data can be interspersed with portions of file data without deviating from the spirit and scope of the invention.

In accordance with some embodiments of the invention, file data, file system data, and any associated storage block addresses can be sent to a device on a primary communications channel. For example, FileSystemData1 214 and FileData1 216 can be sent to a device on a primary communications channel.

In addition to file data and file system data, each file transfer section of a communications sequence can include commands indicating the beginning and the end of the section. For example, file transfer section 210 can include the command Startfile( ) 212 at the beginning of section 210 and the command Endfile( ) 218 at the end of section 210. In accordance with some embodiments of the invention, such commands can be sent to a device on a sideband communications channel. For example, a device (e.g., device 150) can receive commands Startfile( ) 212 and Endfile( ) 218 on a sideband communications channel and operate based, at least in part, on the commands.

In some embodiments, communications circuitry 160 in device 150 can identify the commands in a sideband communications channel and operate accordingly. For example, communications circuitry 160 may delete the contents of memory 162 when communications circuitry 160 receives a Startfile( ) command 212. In another example, communications circuitry 160 may provide a serial number to host 110 when communications circuitry 160 receives a command requesting information about device 150.

In accordance with some embodiments of the invention, a device can selectively move received data based on commands received on a sideband communications channel. In some embodiments, a device can store received data (e.g., FileSystemData1 214 and FileData1 216) in a buffer memory until receiving a command on a sideband channel indicating the end of a file transfer section (e.g., command Endfile( ) 218) and then transfer the data to a storage component in the device. In the context of system 100, device 150 can store received data in memory 162 until communications circuitry 160 receives a command on a sideband channel indicating the end of a file transfer section. Once device 150 receives such a command, device 150 can transfer the data stored in memory 162 to storage component 152. If the communications interface is disconnected during the file transfer section (e.g., a cable is unplugged), the device may not receive a command indicating the end of the file transfer section. In this situation, any data stored in buffer memory can be considered incomplete and the data can be deleted. Accordingly, file corruption may be minimized because commands provided on a sideband communications channel ensure that only complete units of data are stored on a storage component.

As previously explained, the most problematic file corruption can occur when file system data is incomplete. Given the importance of file system data and practical limits on memory size, a device may only store received file system data in a buffer memory in accordance with some embodiments of the invention. For example, a device can store received file system data (e.g., FileSystemData1 214) in a buffer memory, but immediately send any received file data (e.g., FileData1 216) to a storage component. In the context of system 100, device 150 can store received file system data in memory 162 but send any file data directly to storage component 152. When a command indicating the end of a file transfer section (e.g., command Endfile( ) 218) is received on a sideband communications channel, device 150 can then send the file system data stored in memory 162 to storage component 152. Accordingly, file system data stored in the storage component of the receiving device may always be complete.

In accordance with some embodiments of the invention, a communications sequence can include an eject section. For example, the last section of communications sequence 200 can be eject section 250. An eject section can include data and one or more commands for a host to transmit before terminating a communications interface. For example, eject section 250 can include the command Disconnect( ) 254 to notify the receiving device (e.g., device 150) that the connection is about to be terminated. In some embodiments, command Disconnect( ) 254 may serve as a final command that effectively terminates the communications interface between a host and a device. Command Disconnect( ) 254 can be transmitted to a device on a sideband communications channel. Eject section 250 can also include FileSystemDataN 252 which is an updated set of file system data. FileSystemDataN 252 can be file system data that incorporates each file (i.e., file 1 through file N) that was transferred during communications sequence 200. FileSystemDataN 252 can be transmitted to a device on a primary communications channel. While FileSystemDataN 252 may be duplicative of the file system data transferred in the last file transfer section 240 of communications sequence 200, transferring the file system data again can decrease the chances of file corruption by ensuring that the receiving device has complete file system data.

In some embodiments, an eject section can include a start command at the beginning of the section and an end command at the end of the section. Start and end commands in the eject section can function in a manner similar to the command Startfile( ) 212 and the command Endfile( ) 218, as previously explained. Accordingly, the commands can be used to ensure any file system data transferred during the eject section (e.g., FileSystemDataN 252) is complete when it is stored in a receiving device. For example, a start command can be provided before FileSystemDataN 252 and an end command can be provided after FileSystemDataN 252.

It is understood that a software program running on a host can select which particular files are transferred to a device, and the exemplary data included in communications sequence 200 is provided merely for illustrative purposes. For example, a software program may allow a user to select one or more particular files for transfer to a device and then generate a communications sequence based on the user's selections. Moreover, a communications sequence can include file system data beyond what is shown in communications sequence 200 without deviating from the spirit and scope of the invention. For example, each file transfer section of a communications sequence can include multiple file allocation tables (e.g., FAT0 and FAT1) as well as directory information.

Figure 3:
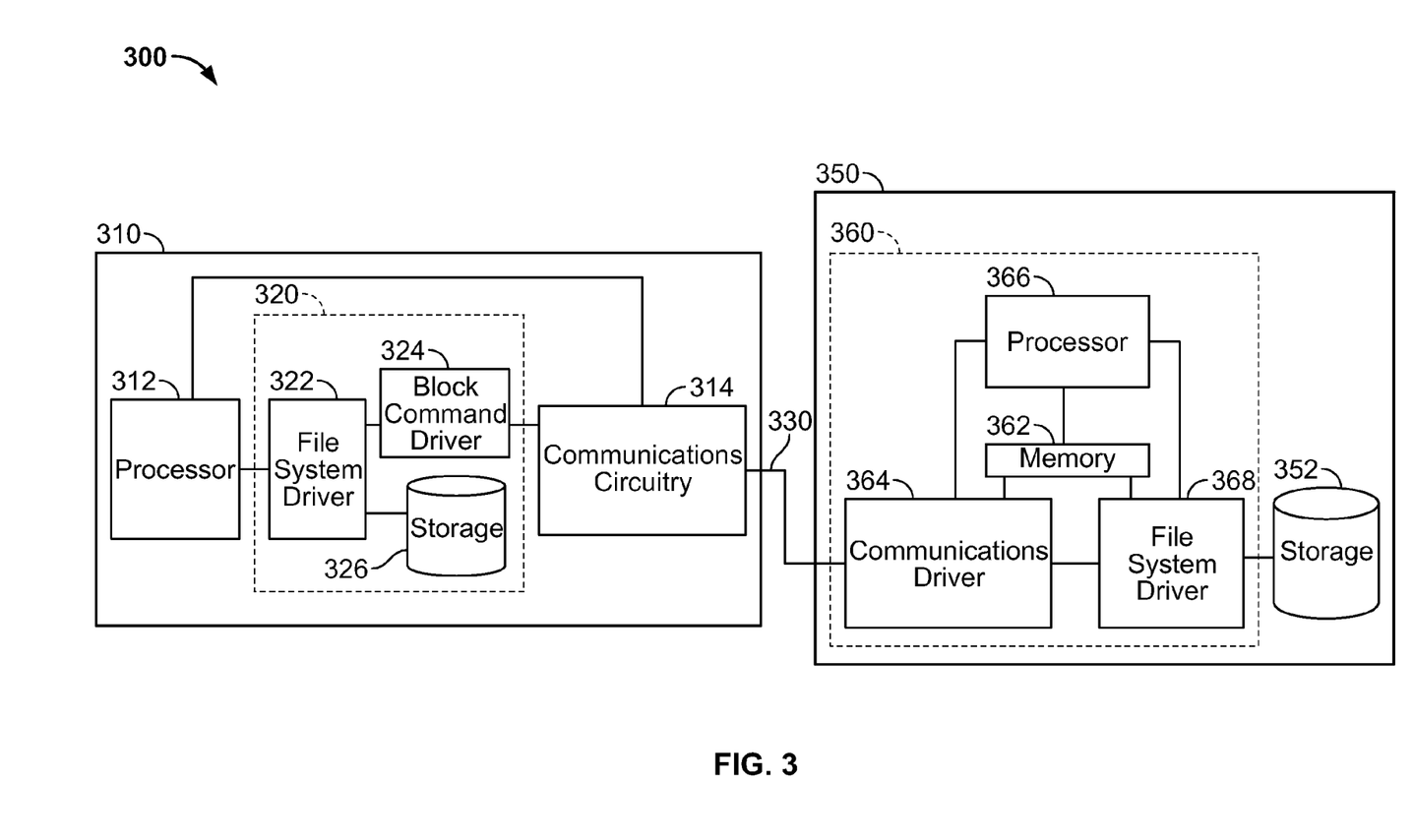
FIG. 3 is a simplified schematic of a communications system in accordance with some embodiments of the invention.

FIG. 3 includes communications system 300 in accordance with some embodiments of the invention. System 300 can include host 310, communications interface 330, and device 350. Host 310, communications interface 330, and device 350 can be substantially similar to, respectively, host 110, communications interface 130, and device 150, and the previous description of the former can be applied to the latter.

Host 310 can include processor 312 (see, e.g., processor 112), communications circuitry 314 (see, e.g., communications circuitry 114), and file system 320 (see, e.g., file system 120). Host 310 can also include file system driver 322, block command driver 324, and storage component 326 within file system 320.

File system driver 322 can be coupled with processor 312, storage component 326, and block command driver 324. Storage component 326 can, for example, be a hard disk drive or a solid-state drive (e.g., a flash drive) for storing data. File system driver 322 can include circuitry for controlling the operation of file system 320. File system driver 322 can provide an interface between processor 312 and storage component 326. For example, file system driver 322 can control the flow of data between processor 312 and storage component 326.

Block command driver 324 can be coupled with file system driver 322 and communications circuitry 314. Block command driver 324 can facilitate the transfer of files to device 350. Block command driver 324 may have access to detailed information about the file system in device 350. For example, block command driver 324 can provide addresses of available blocks in storage component 352 so that each file being transferred to device 350 may be sent to an available storage block. In some embodiments, block command driver 324 can provide updated file system data to accompany a file being transferred. The updated file system data can incorporate a pointer to the block address where the file may be eventually stored in storage component 352 so that the file may be accessible by device 350 after it is stored. For example, block command driver 324 can use file system data corresponding to the current content of storage component 352 (i.e., existing file system data) to generate updated file system data. In some embodiments, device 350 may send a copy of its existing file system data to host 310 before block command driver 324 generates updated file system data. In other embodiments, file system 320 may store a copy of the last set of file system data sent to device 350, and that copy can be considered the existing file system data.

Communications circuitry 314 (see, e.g., communications circuitry 114) can be coupled with processor 312 and block command driver 324. Communications circuitry 314 can include circuitry for communicating in accordance with a USB protocol. In some embodiments, communications circuitry 314 can combine data from block command driver 324 and commands from processor 312 to generate signals for transmission to device 350. For example, communications circuitry 314 can provide data from block command driver 324 to device 350 on a primary communications channel and commands from processor 312 to device 350 on a sideband communications channel (see, e.g., discussion above regarding communications circuitry 114, processor 112, and file system 120).

Device 350 can include storage component 352 (see, e.g., storage component 152), communications circuitry 360 (see, e.g., communications circuitry 160), and memory 362 (see, e.g., memory 162). Device 350 can also include communications driver 364, processor 366, and file system driver 368 within communications circuitry 360.

Communications driver 364 can receive signals from host 310 through interface 330. In some embodiments, communications driver 364 can include circuitry for communicating in accordance with a USB protocol. In some embodiments, communications driver 364 can both receive signals from and transmit signals to host 310 through interface 330.

In addition to interface 330, communications driver 364 can be coupled with memory 362, processor 366, and file system driver 368. Communications driver 364 can convert received signals into various communications channels. For example, communications driver 364 can convert received signals into a primary communications channel and a sideband communications channel. In some embodiments, communications driver 364 can selectively route received file system data to memory 362, received file data to file system driver 368, and received commands to processor 366. In other embodiments, communications driver 364 may route all received data to memory 362 and any received commands to processor 366.

Processor 366 can include any suitable processor for performing software instructions. In embodiments where device 350 is a computer, processor 366 can include a central processing unit. In other embodiments, processor 366 can include any suitable processor (e.g., a microprocessor). Processor 366 can run one or more software programs stored in device 350. For example, processor 366 can run operating system software that controls the general operation of device 350. Processor 366 can run application software stored in device 350. For example, if device 350 is a portable media device, processor 366 can run software for accessing media stored in storage component 352 and then playing the media.

Processor 366 can be coupled with memory 362, communications driver 364, and file system driver 368. Processor 366 can control the operation of one or more portions of device 350 based, at least partially, on commands received from host 310 on a sideband communications channel. Accordingly, processor 366 can control the storage of data in memory 362 during a file transfer section and the transfer of data from memory 362 to storage component 352 after the file transfer section is finished. When processor 366 receives a command indicating the beginning of a file transfer section (see, e.g., command Startfile( ) 212), processor 366 can instruct memory 362 to delete any data stored in memory 362. When processor 366 receives a command indicating the end of a file transfer section (see, e.g., command Endfile( ) 218), processor 366 can instruct memory 362 to transfer any data stored in memory 362 to file system driver 368.

File system driver 368 can be coupled with storage component 352, memory 362, communications driver 364 and processor 366. File system driver 368 can include circuitry for controlling the operation of storage component 352. File system driver 368 can provide an interface between storage component 352 and other portions of device 350. For example, file system driver 368 can regulate the flow of data between memory 362 and storage component 352, communications driver 364 and storage component 352, and processor 366 and storage component 352.

Figure 4:
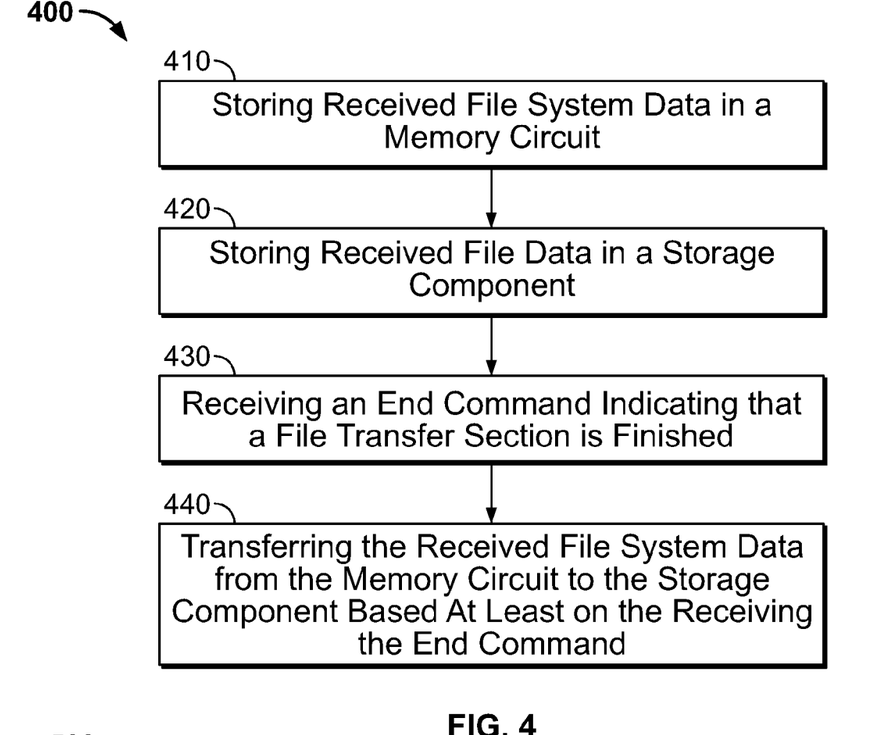
FIG. 4 is an illustrative flowchart of a method for minimizing file corruption in accordance with some embodiments of the invention.

FIG. 4 is a flowchart of a method 400 for minimizing file corruption in accordance with some embodiments of the invention. Method 400 can be performed by a communications system (see, e.g., communications system 100 or communications system 300). In some embodiments, method 400 can be performed by a device in a communications system that is receiving a file transfer (see, e.g., device 150 or device 350).

At step 410, received file system data can be stored in a memory circuit. For example, a device can receive file system data from a host and store the file system data in a memory circuit (see, e.g., memory 162 or memory 362). The file system data can be transmitted to a device on a primary communications channel. In some embodiments, the file system data can be generated by a file system in the host (see, e.g., file system 120 or block command driver 324 within file system 320). The file system data can include, for example, a file allocation table and/or directory information (e.g., information about the contents of a directory). In some embodiments, received storage block addresses associated with the file system data can also be stored in the memory circuit.

At step 420, received file data can be stored in a storage component. For example, the device can receive file data from the host and store the file data in a storage component (see, e.g., storage component 152 or storage component 352). The file data can be transmitted to a device on a primary communications channel. In some embodiments, the file data can be generated by a file system in the host (see, e.g., file system 120 or file system driver 322 within file system 320). The file data can include, for example, data from a storage component in a host (see, e.g., storage component 326). The file data can be stored based on a storage block address received with the file data. For example, circuitry in a host's file system (see, e.g., block command driver 324) can generate a storage block address corresponding to an available storage block in the receiving device's storage, and that address can be transmitted to the device with the file data.

At step 430, an end command can be received indicating that a file transfer section is finished. In some embodiments, the end command can be received on a sideband communications channel. For example, the device can receive an end command from a host on a sideband communications channel, and the end command can indicate that a file transfer section is finished (see, e.g., command Endfile( ) 218). The end command can be generated by a processor in the host (see, e.g., processor 112 or processor 312) and transmitted to the device.

At step 440, the received file system data can be transferred from the memory circuit to the storage component based at least on the receiving the end command. For example, the device can transfer all of the received file system data from the memory circuit to the storage component. Transferring the received file system data can include overwriting old file system data stored on the receiving device's storage component with the received file system data. Accordingly, the file system data in the storage component can be updated to incorporate the received file data. In embodiments where one or more storage block addresses associated with the file system data are stored in the memory circuit, the file system data can be transferred to locations in the storage component that are specified by the addresses. In some embodiments, if a predetermined amount of time has elapsed and no end command has been received, it can be assumed that the file transfer section was disrupted, and the data stored in the memory circuit can be deleted.

In some embodiments, method 400 can include receiving file system data on a primary communications channel prior to the storing received file system data. Method 400 can also include receiving file data on a primary communications channel prior to the storing received file data.

In some embodiments, method 400 can include receiving, on a sideband communications channel, a start command indicating that a file transfer section is beginning and deleting any data stored in the memory circuit before storing received file system data in the memory circuit. For example, the device can receive a start command on a sideband communications channel, and the start command can indicate that a file transfer section is beginning (see, e.g., command Startfile( ) 212). In response to the start command, the device can delete any data stored in the memory circuit. In this manner, the contents of the memory circuit may only include file system data from the current file transfer section.

Figure 5:
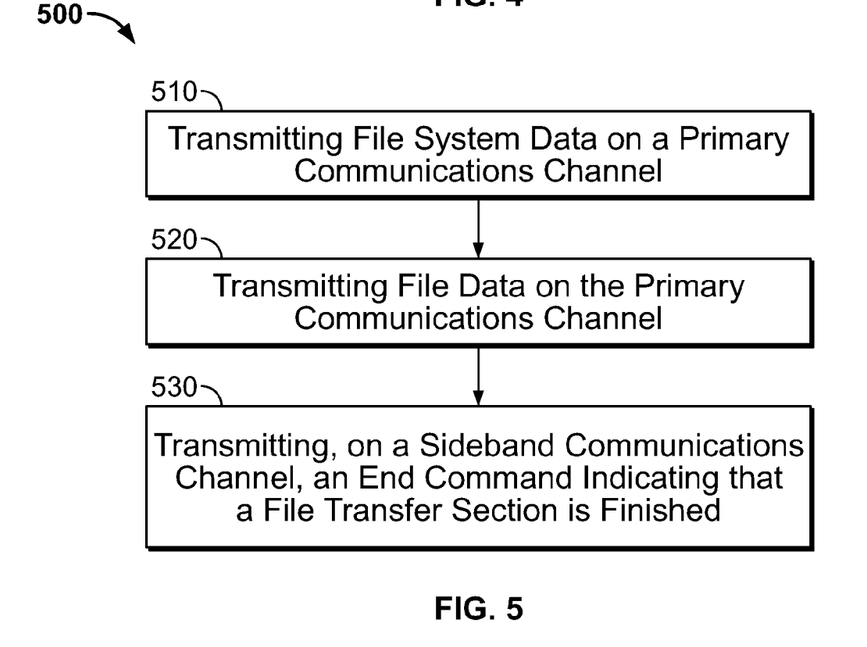
FIG. 5 is an illustrative flowchart of a method for minimizing file corruption in accordance with some embodiments of the invention.

FIG. 5 is a flowchart of a method 500 for minimizing file corruption in accordance with some embodiments of the invention. Method 500 can be performed by a communications system (see, e.g., communications system 100 or communications system 300). In some embodiments, method 500 can be performed by a host in a communications system (see, e.g., host 110 or host 310).

At step 510, file system data can be transmitted on a primary communications channel. For example, a host can transmit file system data to a device on a primary communications channel. In some embodiments, the file system data can be generated by circuitry in a host's file system (see, e.g., block command driver 324). The file system data can include, for example, a file allocation table and/or directory information (e.g., information about the contents of a directory). In some embodiments, one or more storage block addresses associated with file system data can also be transmitted on the primary communications channel.

At step 520, file data can be transmitted on the primary communications channel. For example, a host can transmit file data to a device on a primary communications channel. In some embodiments, the file data can be generated by circuitry in a host's file system (see, e.g., file system driver 322). The file data can include, for example, data from a storage component in a host (see, e.g., storage component 326). In some embodiments, a storage block address associated with the file data can also be transmitted on the primary communications channel. For example, circuitry in a host's file system (see, e.g., block command driver 324) can generate a storage block address corresponding to an available storage block in the receiving device's storage component and that storage block address can be transmitted on the primary communications channel.

At step 530, an end command can be transmitted on a sideband communications channel. The end command can indicate that a file transfer section is finished. For example, a host can transmit an end command to a device on a sideband communications channel to notify the device that a file transfer section is finished (see, e.g., command Endfile( ) 218). In some embodiments, the end command can be generated by circuitry in a host (see, e.g., processor 112 or processor 312).

In some embodiments, method 500 can also include transmitting, on a sideband communications channel, a start command indicating that a file transfer is beginning. The start command can be transmitted prior to the transmitting the file system data. For example, a host can transmit a start command to a device on a sideband communications channel to notify the device that a file transfer section is beginning (see, e.g., command Startfile( ) 212). In some embodiments, the start command can be generated by circuitry in a host (see, e.g., processor 112 or processor 312).

It is to be understood that the foregoing is only illustrative of the principles of the invention, that various modifications can be made by those skilled in the art without departing from the spirit and scope of the invention, and that the invention is limited only by the claims that follow.

What is claimed is:

1. A method for minimizing file corruption during a file transfer between a host device and a client device, wherein primary and side channels exist between the host and client devices, the method implemented in the client device, and the method comprising:

storing received file system data temporarily in a client device memory circuit, wherein the file system data represents information about a file system of a storage component, wherein the file system data is received over the primary communications channel from the host device, and wherein the received file system data comprises a file allocation table pertaining to a file system of the client;

storing received file data directly in the client device storage component, wherein the file data is received over the primary communications channel from the host device, and wherein a size of the file data is too large to be temporarily stored in the client device memory circuit;

receiving, at the client device, an end command, from the host device, indicating that a file transfer section is finished, wherein the end command is received over the side channel;

transferring the received file system data from the client device memory circuit to the storage component based at least on the receiving of the end command; and receiving, on the sideband communications channel, a start command indicating that the file transfer section is beginning; and based on the receiving the start command, deleting data in the client device memory circuit before the storing the received file system data in the client device memory circuit.

2. The method of claim 1, further comprising receiving the file system data on the primary communications channel prior to the storing the received file system data.

3. The method of claim 1, wherein the transferring comprises overwriting old file system data stored on the storage component with the received file system data.

4. The method of claim 1, wherein the file transfer section comprises:
   a start command indicating that the file transfer section is beginning;
   the file data;
   the file system data; and
   the end command.

5. A method for minimizing file corruption during a file transfer between a host device and a client device, the method comprising:
   transmitting file system data on a primary communications channel from the host device to the client device, wherein the file system data represents information about a file system of a storage component of the client device, the file system data comprising a file allocation table of the storage component of the client device;
   transmitting file data on the primary communications channel from the host device to storage component of the client device, wherein a size of the file data is too large to be temporarily stored in the client device memory circuit;
   transmitting, on a sideband communications channel, from the host device to the client, an end command indicating that a file transfer section is finished; and
   transmitting, on the sideband communications channel, a start command indicating that the file transfer section is beginning prior to the transmitting the file system data, wherein the start command causes the client device to delete data stored in its memory circuit before storing the received file system data temporarily in its memory circuit, when the size of the file data is not too large.

6. The method of claim 5, wherein the file transfer section comprises:
   a start command indicating that the file transfer section is beginning;
   the file data;
   the file system data; and
   the end command.

7. A file transfer system for minimizing file corruption during a file transfer, the system comprising:
   a host configured to transmit file system data and file data on a primary communications channel and commands on a sideband communications channel to a client device, wherein the file system data represents information about a file system of a storage component of the client device, and wherein the client device provided information on its file system to the host prior to transmission of any file system data and file data; and
   the client device coupled to the host, the client device comprising:
      the storage component configured to store the file data when the file data is received from the host on the primary communications channel; and
      a memory circuit coupled to the storage component and configured to temporarily store the file system data received from the host on the primary communications channel until the device receives, on the sideband communications channel, an end command indicating that a file transfer section is finished, wherein the device is configured to transfer the file system data from the memory circuit to the storage component when the device receives the end command; and
      a processor operative to:
         receive, on the sideband communications channel, a start command indicating that the file transfer section is beginning; and
         based on the receiving the start command, delete data in the memory circuit before storing the received file system data in the memory circuit.

8. The system of claim 7, wherein the file system data includes a file allocation table.

9. The system of claim 7, wherein the file system data includes directory information.

10. The system of claim 7, wherein the host comprises:
    a processor configured to generate the end command;
    a block command driver configured to generate the file system data and the file data; and
    communications circuitry coupled to the processor and the block command driver and configured to transmit the file system data and the file data on the primary communications channel and the end command on the sideband communications channel.

11. The system of claim 7, wherein the client device further comprises communications circuitry coupled to the memory circuit and the storage component, the communications circuitry configured to receive the file data and the file system data on the primary communications channel and the end command on the sideband communications channel from the host.

* * * * *